United States Patent
Nagarajan et al.

(10) Patent No.: US 7,420,712 B2
(45) Date of Patent: Sep. 2, 2008

(54) SYSTEMS AND METHODS THAT ALTER ELECTRONIC DATA BASED ON AVAILABILITY OF TIME

(75) Inventors: Ramesh Nagarajan, Pittsford, NY (US); Reiner Eschbach, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 733 days.

(21) Appl. No.: 10/709,810

(22) Filed: May 28, 2004

(65) Prior Publication Data
US 2005/0275860 A1 Dec. 15, 2005

(51) Int. Cl.
G06K 15/00 (2006.01)
(52) U.S. Cl. ............ 358/3.27; 358/537; 358/403; 358/452; 358/1.15; 358/1.16; 382/305; 718/102; 718/104
(58) Field of Classification Search .......... 358/1.13, 358/1.15, 1.16, 1.11, 537, 403, 3.27, 452; 709/213, 247; 707/1; 438/14; 395/110; 345/611; 711/167; 718/102, 101, 104; 382/305
See application file for complete search history.

(56) References Cited

U.S. PATENT DOCUMENTS

| | | | |
|---|---|---|---|
| 5,119,471 A * | 6/1992 | Kagaya et al. ......... 358/1.11 |
| 5,363,209 A | 11/1994 | Eschbach et al. |
| 5,414,538 A | 5/1995 | Eschbach |
| 5,450,217 A | 9/1995 | Eschbach et al. |
| 5,450,502 A | 9/1995 | Eschbach et al. |
| 5,581,370 A | 12/1996 | Fuss et al. |
| 6,081,211 A | 6/2000 | de Queiroz et al. |
| 6,112,250 A * | 8/2000 | Appelman ............ 709/247 |
| 6,417,014 B1 * | 7/2002 | Lam et al. ............ 438/14 |
| 6,597,365 B1 * | 7/2003 | Baecke et al. ......... 345/611 |
| 6,618,171 B1 | 9/2003 | Tse et al. |
| 2003/0028503 A1 * | 2/2003 | Giuffrida et al. ......... 707/1 |
| 2004/0205146 A1 * | 10/2004 | Kimura et al. ......... 709/213 |

OTHER PUBLICATIONS

The Kleper Report on Digital Publishing, Jul./Aug. 2000, Graphic Dimensions, Issue 5.4, p. 22.*

* cited by examiner

*Primary Examiner*—King Poon
*Assistant Examiner*—Jamares Washington
(74) *Attorney, Agent, or Firm*—Oliff & Berridge PLC

(57) ABSTRACT

A multifunctional device that processes electronic data includes a processor that processes the electronic data, a memory that stores the electronic data, an alteration circuit that alters the structure of the electronic data and a controller that determines whether idle time exists when the electronic data is stored in the memory, and controls the alteration circuit to alter the electronic data when the controller determines that idle time exists. Moreover, a method of processing electronic data includes processing the electronic data, storing the electronic data, controlling the electronic data by determining whether idle time exists when the electronic data is stored and altering the electronic data when sufficient idle time exists.

22 Claims, 5 Drawing Sheets

SYSTEMS AND METHODS THAT ALTER ELECTRONIC DATA BASED ON AVAILABILITY OF TIME

BACKGROUND OF THE INVENTION

1. Field of the Invention

The invention relates to systems and methods for processing data with a multifunctional device. More specifically, the systems and methods of the invention alter the data based on an availability of idle time of the multifunctional device.

2. Description of Related Art

Conventional multifunctional devices such as digital scanners and digital copiers process electronic data and then send the processed electronic data to a memory prior to transmitting the electronic data to another destination. For example, after image data has been processed into a Joint Photographic Experts Group (JPEG) electronic data file, the electronic data file can be sent to a memory or temporary holding queue prior to the electronic data file being sent to an out terminal or receiving device like a printer, or prior to the electronic data file being exported to a network. Because the electronic data file stored and awaiting further action, the process creates "idle time" before the electronic data file is transmitted to the output terminal or requested by the receiving device for either the printing or exporting. In some instances, the electronic data file is either waiting for a previous print job to finish printing or waiting in the queue because of a backlog in the network. The data file can also be stalled in the queue due to a higher priority job that takes precedent. Thus, the state of the output terminal or receiving device, a higher level interrupt created at the output terminal or receiving device for a different job or any other external delay in handling the current job can cause idle time to exist in the multifunctional device.

Some multifunctional devices allow a user to use a "store and call" feature whereby a job is scanned or copied and then stored in a memory so that the electronic data can be recalled at a later time. Furthermore, some multifunctional devices allow a user to scan electronic data to a mailbox memory so that the user can send the electronic data over a network at a later time. Distributed scanning of images is also possible in some multifunctional devices whereby multiple documents are scanned to create an electronic data file, and sent to a central memory device prior to the electronic data being used for some other purpose. In many instances, these functions create the idle time as discussed above. However, conventional multifunctional devices do not utilize the idle time to further process the electronic data stored in the memory or in a queue in order to alter the electronic data so that the multifunctional device can increase productivity or anticipate additional user needs.

SUMMARY OF THE INVENTION

Accordingly, to satisfy the continuing need to improve quality, performance and the efficiency of existing multifunctional devices, the "idle time" of a multifunctional device according to the invention is utilized to perform additional processing to alter the electronic data to satisfy user needs. For example, processing can be performed during the idle time to improve image quality and increase productivity by recompressing the electronic data based on additional requirements of the user. In some situations, recompressing electronic data into certain formats can be time consuming. The idle time in conventional multifunctional devices is not used to perform alterations on an electronic data stored in memory. Thus, the invention improves efficiency of the multifunctional device by taking advantage of the idle time to further alter an electronic data file. The invention can alter the electronic data file during the idle time by performing, for example, 2-pass image processing and additional image enhancements like Auto Image Enhancement (AIE), Auto Image Quality (AIQ) processing applications, applications like Mixed Raster Content Generation that reformat compressed documents to achieve smaller document size and OCR Optical Character Recognition processing. Furthermore, the alterations during the idle time could generate summary pages that can be attached to a job or extract any other metadata and send it along with the electronic data file for improved printing performance.

In accordance with the systems and methods of the invention, a multifunctional device can include an input terminal that inputs electronic data. The electronic data is stored in a memory, and then the stored electronic data is altered during idle time of the multifunctional device. After the electronic data is stored in the memory, a controller can control the electronic data to be altered by a processor during the idle time to improve the quality of the data or to perform any number of tasks.

In various exemplary embodiments according to the systems and methods of the invention, a multifunctional device can include a second controller that controls the electronic data to be altered by second processor, for example, after the image has been initially converted to electronic data from an image, but prior to the electronic data being stored in the memory. The second processor alters the electronic data using minimal requirements so that the data can still be transmitted to a receiving device or an output terminal, such as a printer, or exported to a network even if no further alterations to the electronic data is performed.

In various exemplary embodiments according to the systems and methods of the invention, a multifunctional device can also include a third controller that controls a third processor to alter the electronic data after the electronic data has been requested by the output device but prior to the data being transmitted to the receiving device, output terminal or a network.

BRIEF DESCRIPTION OF THE DRAWINGS

Various exemplary embodiments of the systems and methods according to this invention will be described in detail, with reference to the following figures, wherein.

DETAILED DESCRIPTION OF EXEMPLARY EMBODIMENTS

The invention relates generally to systems and methods for utilizing idle time of a multifunctional device to alter electronic data according to user requirements. For reasons of convenience, the embodiments of the invention will be discussed using a digital scanner as the multifunctional device. However, it should be appreciated by one skilled in the art that the systems and methods of the invention can be used with any multifunctional device that creates idle time without departing from the sprit and scope of the invention.

Figure 1:
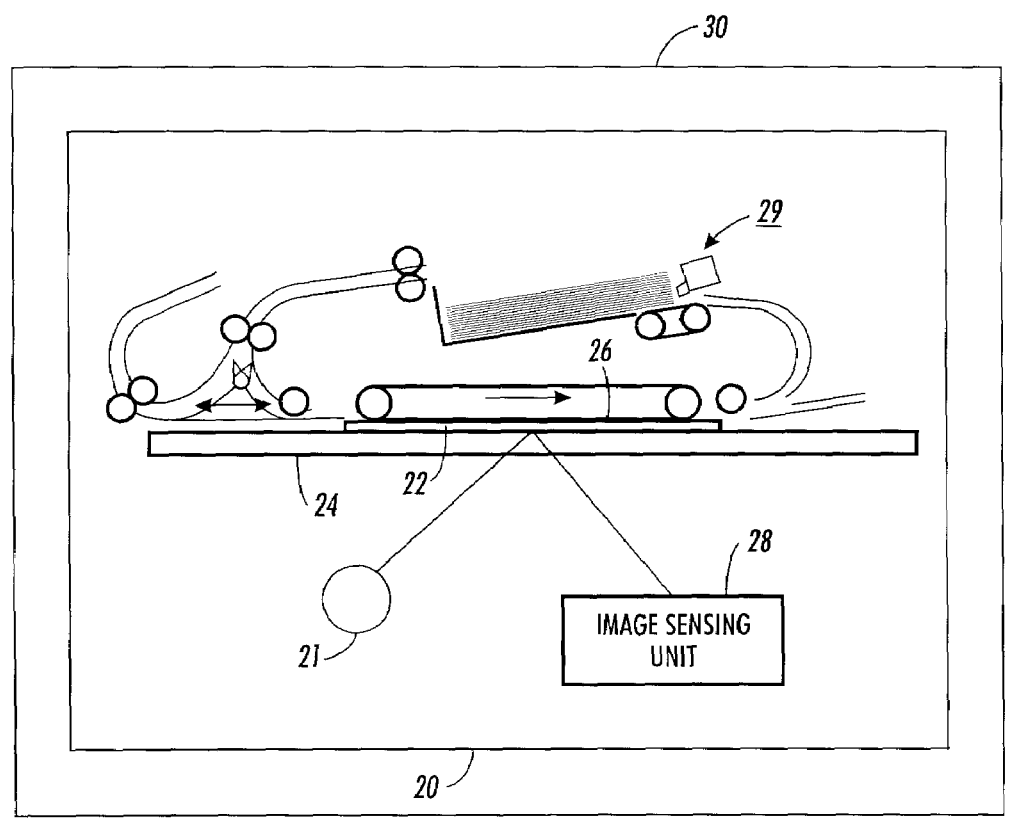
FIG. 1 is an exemplary diagram illustrating system components of a multifunctional device.

FIG. 1 is an exemplary diagram illustrating system components of a digital scanner as the multifunctional device. As shown in FIG. 1, components of a scanning unit 20 of a digital scanner 30 include a light source 21 that is used to illuminate a document 22 prior to scanning. In a platen-type scanning situation, the document 22 usually rests upon a glass platen 24, which supports the document 22 for scanning purposes. The document may be placed in the glass platen 24 by an operator. Alternatively, the scanning unit 20 may include a feeder or document handler 29, which places the document on the glass 24. Another example of a feeder is shown in U.S. Pat. No. 5,430,536 which is hereby incorporated by reference in its entirety.

On top of the glass platen 24 and the document 22, a backdrop portion (or platen cover) 26 is placed so as to prevent stray light from leaving the scanning area and to provide an acceptable background for distinguishing an input document. The backdrop portion 26 is part of the document handler 29 and is the surface or surfaces that can be scanned by an image-sensing unit 28 when the document 22 is or not present in the scanning station. When operating the scanning unit 20, the light source 21 illuminates the document 22, and then light reflected from the document 22 passes through a lens subsystem (not shown) so that the reflected light impinges upon the image sensing unit 28. The image sensing unit 28 can be any type of electronic sensor including a charge coupled device (CCD) array or a full width array. Examples of full width arrays that can be used in the image sensing unit 28 are disclosed in U.S. Pat. Nos. 5,473,513; 5,748,344; 5,552,828; 5,691,760; 5,031,032; 5,545,913; and 5,604,362, which are hereby incorporated by reference in their entirety.

Figure 2:
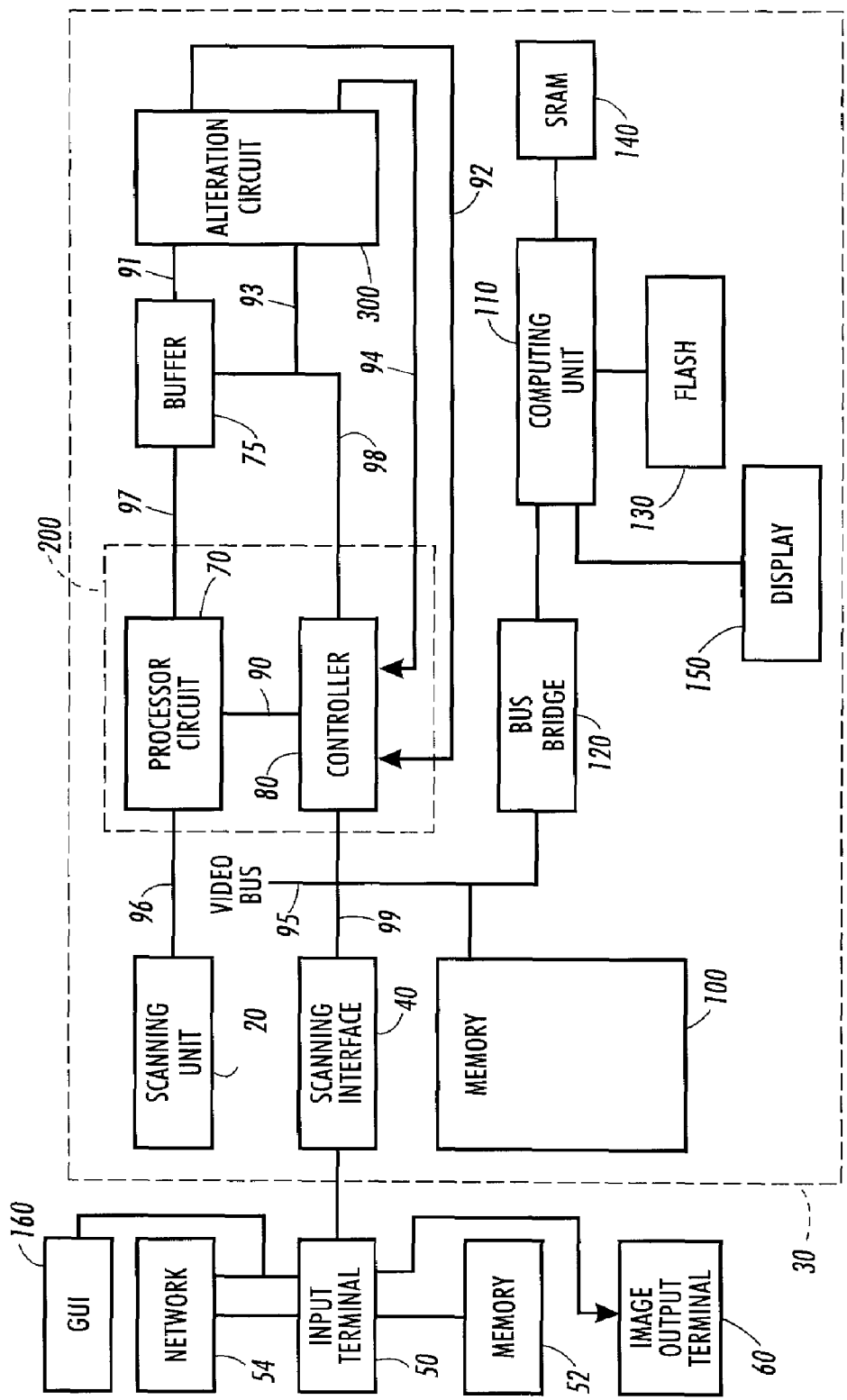
FIG. 2 is an exemplary block diagram illustrating the circuitry for the multifunctional device in accordance with the invention.

FIG. 2 is an exemplary block diagram illustrating the circuitry for the digital scanner 30 in accordance with the invention. The digital scanner 30 is coupled to an input terminal 50 by way of an interface 40. An example of a suitable scanner interface is a SCSI interface. Examples of the input terminal 50 include a personal computer, a computer terminal and a remote computer unit. The input terminal 50 includes and/or has access to a memory 52. The input terminal 50 is preferably adapted to communicate with a network 54, and to communicate with the Internet either directly or through the network 54. The digital scanner 30 can be coupled to at least output terminal 60 such as a printing system.

In the digital scanner 30, a computing unit 110, such as a microprocessor, can be coupled to the interface 40, memory 100 and a processor 200 by way of the bus 95 and a bus bridge 120. The computing unit 110 can be coupled to a flash memory 130, static RAM 140 and a display 150. The computing unit 110 is also connected to the processor 200 and the scanning unit 20 shown in FIG. 1 by way of the bus 95.

The processor 200 in the digital scanner 30 can include a processing circuit 70 and a controller 90. In the illustrated embodiment, the processing circuit 70 and the controller 90 are implemented with general purpose processors. However, it will be appreciated by those skilled in the art that the processing circuit 70 and the controller 90 can be implemented using a single special purpose integrated circuit (e.g., ASIC) having a main or central processor section for overall, system-level control, and separate sections dedicated to performing various different specific computations, functions and other processes under control of the central processor section. The processing circuit 70 and the controller 90 can be a plurality of separate dedicated or programmable integrated or other electronic circuits or devices (e.g., hardwired electronic or logic circuits such as discrete element circuits, or programmable logic devices such as PLDs, PLAs, PALs or the like). The processing circuit 70 and the controller 90 can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the processing circuit 70 and the controller 90. A distributed processing architecture can be used for maximum data/signal processing capability and speed.

When operated, the scanning unit 20 scans an image (or object) and converts analog signals representative of the image received by the image sensing unit 28 into electronic signals or electronic data. The controller 90 controls the electronic data so that the processor 200 receives the digital image via link 96, registers the image, and executes a signal correction to enhance the electronic signals. As the processor 200 continuously processes the electronic data, a buffer 75 can temporarily store the electronic data outputted by the processor 200. After the entire image or a sufficient part of the image has been processed by the processor 200, the electronic data can be controlled by the controller 90 so that the electronic data is stored in the memory 100 via the link 98 and the bus 95 without any further processing (such as compression) to await further action. This action can create "idle time," for example, where a lag in time exists before the scanned data is either marked for printing or transferred over a network. In this instance, the electronic data is stored in the memory 100 before the next event occurs.

Figure 3:
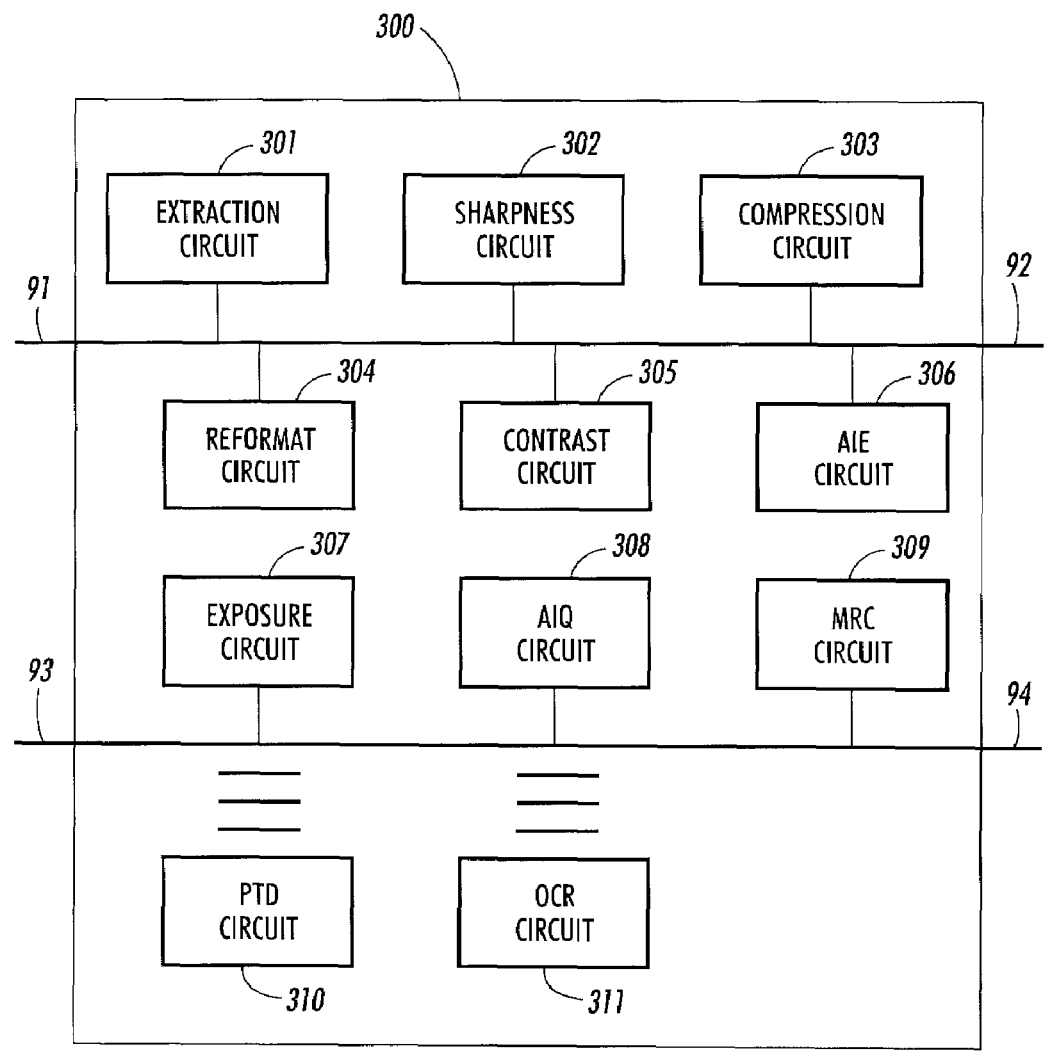
FIG. 3 is an exemplary block diagram illustrating the alteration circuit used in the multifunctional device in FIG. 2 in accordance with the invention.

Alternatively, the controller 90 can control the processor 200 to transmit the electronic data, for example, to an alteration circuit 300 through the buffer 75 and link 91, or through link 93. FIG. 3 is an exemplary block diagram the alteration circuit 300 used in the multifunctional device in FIG. 2 in accordance with the invention. The alteration circuit 300 can include circuits 301-311 that perform electronic data alterations like a metadata extraction circuit 301, a sharpness circuit 302, a compression circuit 303, a reformatting circuit 304, a contrast circuit 305, an Auto Image Enhancement (AIE) circuit 306, an exposure circuit 307, an Auto Image Quality (AIQ) circuit 308, a Mixed Raster Content (MRC) circuit 309, an optional circuit for detecting additional properties of the image, for example the originating source, 310 and/or an Optical Character Recognition (OCR) circuit 311.

It should be appreciated by one skilled in the art that any number of data enhancement, data reorganization or data reformatting circuits may be used for the idle time processing. Moreover, any process that alters the structure of the electronic data stored in the memory 100 may be performed by the processor 200 during the idle time without departing from the spirit and scope of the invention. Furthermore, the circuits shown in the alteration circuit 300 in FIG. 3 can include any circuit or combination of circuits that alter the electronic data stored in the memory 100 of the multifunctional device of the invention. For example, the compression circuit 303 can include the International Telecommunications Union (ITU) G3/G4 and Joint Photographic Experts Group (JPEG). However, other data compression units may be substituted for ITU G3/G4 and JPEG.

The electronic data can be altered using the circuits 301-311 described above by using, for example, a minimal buffering method for optimizing encoding tables in JPEG compression as disclosed in U.S. Pat. No. 6,081,211. The sharpness of the data can be altered by the reproduction process of an electronically encoded natural scene image as disclosed in U.S. Pat. No. 5,363,209. The contrast of image data can be altered by deriving a relevant histogram of the image data from a selected subset of local histograms representing regions of the image as disclosed in U.S. Pat. No. 5,581,370, or by the method whereby the image data is converted from an original set of color coordinates to an expression where on term has a relationship to overall image density as disclosed in U.S. Pat. No. 5,450,502. The data can be altered by the image-dependent color saturation correction method in natural scene images in electronic documents as disclosed in U.S. Pat. No. 5,450,217. Finally, an exposure in the reproduction of an electronically encoded natural scene image can be altered as disclosed in U.S. Pat. No. 5,414,538. All of the above cited references disclose examples of altering the electronic data by the circuits 301-311 that can be used within the spirit and scope of the invention and are hereby incorporated by reference in their entirety.

Figure 4:
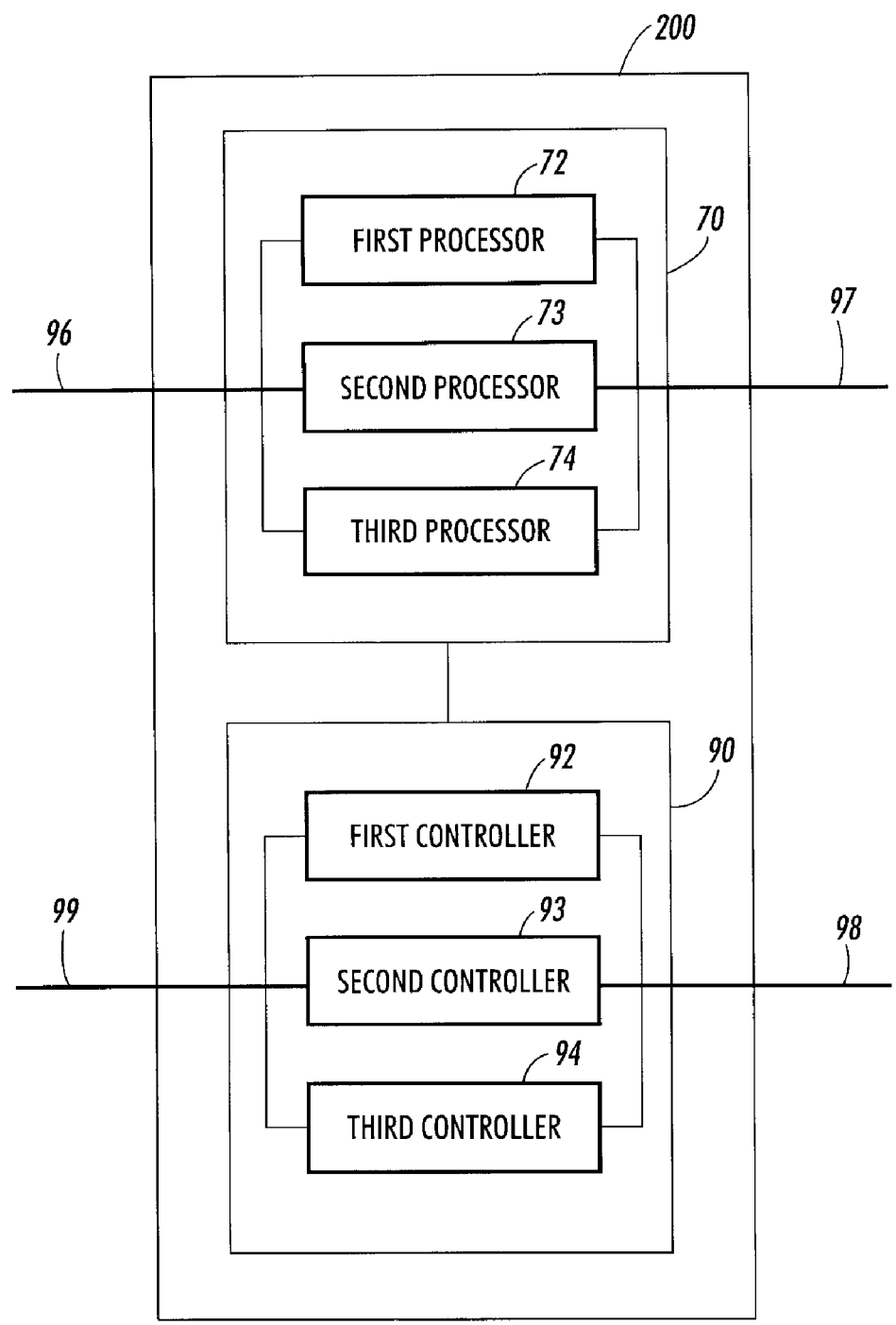
FIG. 4 is an exemplary block diagram illustrating the processor used in the multifunctional device in FIG. 2 in accordance with the invention.

FIG. 4 is an exemplary block diagram the processor 200 used in the multifunctional device in FIG. 2 in accordance with the invention. As shown in FIG. 4, the processor 200 includes the processing circuit 70 and the controller 90. The processing circuit 70 may include a first processor 72, an second processor 73 and a third processor 74. The second processor 73 may be configured to perform a minimal set of image processing or compression to the electronic data after the image or object is first scanned, but prior to storing the electronic data into the memory 100. The second processor 73 can also process the electronic data so that the electronic data is scanned and processed to include basic image processing functions and any straightforward compression via the compression circuit 303, i.e., JPEG for color documents and G4 for black and white documents. By pre-processing the electronic data with the second processor 73, any minimal requirements are satisfied to transmit the electronic data to another destination in the event that no further alterations are performed because, for example, no idle time exists.

The processor 200 can also include a first processor 72 that can be used when it is determined that idle time exists. In this situation, the controller 90 controls the stored electronic data to be sent from the memory 100 to an alteration circuit 300 for additional alterations such as 2-pass processing and/or the additional alterations discussed above like AIE and AIQ for improved image enhancement and quality. The controller 90 can also control the electronic data to be sent from the memory 100 to a reformatting circuit 304 for reformatting the electronic data into a Mixed Raster Content (MRC) model. The controller 90 can also control the electronic data to be sent from the memory 100 to the reformatting circuit 304 to generate a summary page, and/or generate thumbnails for a print job as a summary page, and attach the summary page to a print job, or to the metadata extraction circuit 301 to extract any other metadata so that the metadata can be sent along with the electronic data for improved printing. A first controller 92 within the processor 200 can monitor the electronic data stored in the memory 100 and determine whether any idle time exists so that further alterations can be performed during the idle time. In various exemplary embodiments according to the invention, a user can manually instruct the first controller 92 to alter an electronic data file if it is determined that an appropriate amount of idle time exists. Furthermore, the first controller 92 can be configured to automatically alter the electronic data based on predetermined parameters when it is determined that an appropriate amount of idle time exists.

The processor 200 can also include a third processor 74 that alters the electronic data after the data has been processed by the first processor 72, but prior to the electronic data being sent to the network or the output terminal. The third processor 74 can perform, for example, Image Output Terminal (IOT) processing for printing or file formatting for exporting the electronic data to another system.

Although the controller 90 in the processor 200 in FIG. 4 can be a single processor, the processor 200 can also be configured to include the first controller 92 discussed above, a second controller 93 and a third controller 94. As shown in FIG. 4, the first controller 92 controls the first processor 72 to process the electronic data during the idle time to alter the structure of the electronic data or to perform any number of tasks. In various exemplary embodiments, the determination of whether an adequate idle time exists by the first controller 92 can be based on an estimation of a duration of idle time available and a comparison the estimation to a predetermined idle time value predetermined and preset by a user.

The second controller 93 can control the second processor 73 to process the electronic data so that the data includes the basic image processing functions and any required compression via the compression circuit 303. The third controller 94 can control the third processor 74 to alter the electronic data just prior to the electronic data being transmitted to the network or the output terminal 60.

Figure 5:
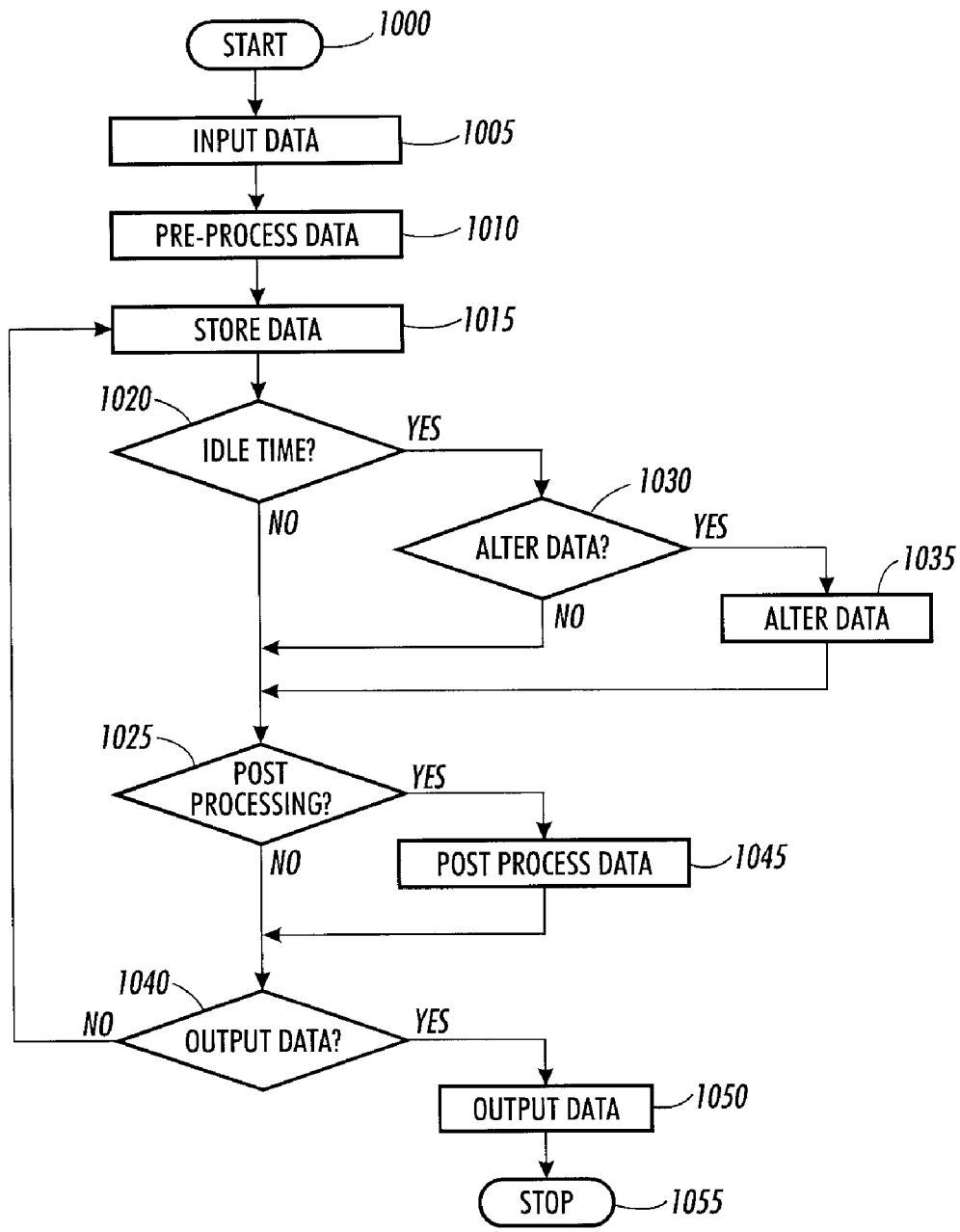
FIG. 5 is an exemplary flowchart of a method of processing used by the multifunctional device in accordance with the invention.

FIG. 5 is an exemplary flowchart of a method of processing used by the multifunctional device in accordance with the invention. After control starts in step 1000, control shifts to step 1005 where data, such as an image or object, is input into the multifunctional device by the input terminal. The data can be input using input terminals such as a personal computer, remote computer or a network. Control then shifts to step 1010 where the second controller controls the electronic data to be processed by the second processor, and converted to electronic data. At step 1010, the second controller can also control the second processor and the alteration circuit to alter the electronic data using the minimum requirements discussed above. Next, control shifts to step 1015 where the electronic data is stored in the memory.

Control then shifts to step 1020. In step 1020, it is determined by the controller whether idle time exists prior to the electronic data being transmitted to another destination. This determination can be based on an estimation of available idle time as discussed above. If it is determined in step 1020 that idle time exists, control shifts to step 1030 where it is further determined whether the electronic data requires further processing to alter the electronic data. If it determined that the data requires alterations as discussed above, the electronic data controlled by the first controller to be processed by the first processor and altered by the alteration circuit based on the requirements of the user. However, if it is determined either in step 1020 that no idle time exists, or in step 1030 that the electronic data does not require alterations or the idle time is determined to be insufficient, then control shifts to step 1025.

In step 1025, control determines whether the electronic data requires post-processing by the third processor and the alteration circuit. If it is determined that the electronic data requires post-processing, then control shifts to step 1045 where the electronic data is controlled by the third controller to be processed by the third processor and altered by the alteration circuit. However, if it is determined that the data does not require post-processing, then control shifts to step 1040.

In step 1040, it is determined whether the electronic data will be outputted, for example, to an output terminal or a network. If it is determined at step 1040 that the electronic data will not be outputted, then control returns to step 1015 where the electronic data is stored in the memory. If it is determined that the electronic data will be outputted, then control shifts to step 1050 where the electronic data is outputted from the multifunctional device. Control then stops at step 1055.

The additional processing described in the invention is only optional processing. The minimal required processing is done as a normal operation leading to the machine design and specifications, and satisfying the basic user expectations. If idle time exists, and only then, is "not requested" processing performed as (a) a "guess" to what the user might want at a later time; (b) as efficiency enhancer for future applications (better compression, e.g. that has an application for remote connection); (c) as an added service that is offered to the user as "bonus". In all cases, if the idle time goes away, or if the process does not finish during idle time, no harm is done to the actual task, since these processes are optional and non-destructive (i.e., the summary page just does not exist, only half of the words are OCR'd, etc). In this case, either the original data is sent, or optionally the original data and part of the enhanced services are sent.

While the invention has been described in conjunction with exemplary embodiment, these embodiments should be viewed as illustrative, not limiting. For example, the multifunction device may be replaced by a dynamic configuration of imaging devices, and associated hardware and software resources. Various other modifications, substitutes, or the like are possible within the spirit and scope of the invention.

The invention claimed is:

1. A multifunctional device that processes electronic data, comprising:
   a processor that processes the electronic data;
   a memory that stores the electronic data;
   an alteration circuit that alters the structure of the stored electronic data; and
   a controller that controls the processor to perform at least some required processing of the electronic data, determines whether the stored electronic data is awaiting further required action unable to be performed at that time following at least some of the performed required processes, determines if the stored electronic data will be waiting for a sufficient period of time, and controls the alteration circuit to perform optional alterations of the stored electronic data when the controller determines that the sufficient period of time exists.

2. The multifunctional device of claim 1, further comprising:
   an input terminal that inputs data into the multifunctional device; and
   an output terminal that outputs the electronic data from the multifunctional device.

3. The multifunctional device of claim 1, the sufficient period of time being a duration of time that the electronic data remains in the memory without being processed, and the controller using a predetermined value to determine whether the sufficient period of time exists when the electronic data is stored in the memory.

4. The multifunctional device of claim 3, the predetermined value being preset by a user, and the controller using the predetermined value to control the alteration circuit to automatically alter the electronic data when it determines that the sufficient period of time exists.

5. The multifunctional device of claim 1, the processor including a second processor that is controlled by the controller to process the electronic data prior to the electronic data being stored in the memory, the processing including the alteration circuit altering the electronic data by compressing the electronic data.

6. The multifunctional device of claim 1, the processor including a third processor that is controlled by the controller to process the electronic data after the electronic data has been requested by an output terminal but prior to the electronic data being transmitted to the output terminal, the processing including the alteration circuit altering the electronic data.

7. The multifunctional device of claim 5, the controller including a second controller that controls the second processor and the alteration circuit to alter to electronic data.

8. The multifunctional device of claim 6, the controller including a third controller that controls the third processor and the alteration circuit to alter to electronic data.

9. The multifunctional device of claim 5, the alteration circuit including a compression circuit that recompresses the electronic data during the sufficient period of time and after the electronic data has been stored in the memory.

10. The multifunctional device of claim 1, the alteration circuit including a circuit that alters one of at least sharpness, contrast, color and exposure of the electronic data.

11. The multifunctional device of claim 1, the alteration circuit operations are non-destructive and provide additional value and capability beyond the basic user requirements for a specified operation.

12. The multifunctional device of claim 10, the alteration circuit including a circuit that extracts metadata from the electronic data.

13. A method of processing electronic data, comprising:
    processing the electronic data with required processes;
    storing the electronic data;
    controlling the processing of the stored electronic data;
    following at least some of the required processes, determining whether the stored electronic data is awaiting further required processes unable to be performed at that time following the performed required processes, determining if the stored electronic data will be waiting for a sufficient period of time between the required processes; and
    altering the stored electronic data with optional alternations after determining that the stored electronic data will be waiting for the sufficient period of time.

14. The method of processing electronic data of claim 13, further comprising:
    inputting an image that is converted into the electronic data; and
    outputting the electronic data to an output terminal.

15. The method of processing electronic data of claim 13, further comprising:
    determining whether the sufficient period of time exists using a predetermined value when the electronic data is stored, the sufficient period of time being a duration of time that the electronic data is stored without being processed.

16. The method of processing electronic data of claim 15, further comprising:
    presetting the predetermined value, and using the predetermined value to automatically control the altering of the electronic data after it is determined that the sufficient period of time exists.

17. The method of processing electronic data of claim 15, further comprising:
    controlling the electronic data to be processed prior to the electronic data being stored in the memory, the processing including the altering of the electronic data by compressing the electronic data.

18. The method of processing electronic data of claim 13, further comprising:

controlling the electronic data to be processed after the electronic data has been requested by an output terminal, but prior to the electronic data being transmitted to the output terminal, the processing including the altering of the electronic data.

19. The method of processing electronic data of claim 13, further comprising:

altering the electronic data to include a change in one of at least sharpness, contrast, color and exposure of the electronic data.

20. The method of processing electronic data of claim 13, further comprising:

extracting metadata from the electronic data.

21. The method of processing electronic data of claim 13, further comprising:

altering the electronic data during the sufficient period of time to include one of at least reformatting the electronic data into a summary page and recompressing the electronic data after the electronic data is stored.

22. A method of using a multifunctional device that includes a processor, a memory, a controller and an altering device, comprising:

processing electronic data with required processes using the processor;

storing the electronic data in the memory; and controlling the processing of the stored electronic data, following at least some of the required processes, using the controller to determine whether the stored electronic data is awaiting further required processes unable to be performed at that time following the performed required processes, determining if the stored electronic data will be waiting for a predetermined sufficient period of time between the required processes;

altering the stored electronic data with optional alterations when it is determined that the stored electronic data will be waiting for the predetermined sufficient period of time.

* * * * *